US007909199B2

(12) United States Patent
Cahill

(10) Patent No.: US 7,909,199 B2
(45) Date of Patent: Mar. 22, 2011

(54) RECEPTACLE, LID AND LID MAINTAINING ASSEMBLY

(76) Inventor: Christopher Cahill, Aston, PA (US)

( * ) Notice: Subject to any disclaimer, the term of this patent is extended or adjusted under 35 U.S.C. 154(b) by 829 days.

(21) Appl. No.: 11/881,712

(22) Filed: Jul. 27, 2007

(65) Prior Publication Data

US 2008/0023478 A1 Jan. 31, 2008

Related U.S. Application Data

(60) Provisional application No. 60/820,841, filed on Jul. 31, 2006.

(51) Int. Cl.
*B65D 55/16* (2006.01)
*A44B 11/25* (2006.01)
*B23P 11/00* (2006.01)

(52) U.S. Cl. ........ 220/375; 220/908; 24/298; 29/525.12

(58) Field of Classification Search .................. 215/306; 220/375, 908; 24/301, 298, 302, 458, 105, 24/111; 292/307 R, DIG. 11, DIG. 38, 325, 258, 288, 289, 291; 16/2.1; 217/113; 29/525.08, 525.12

See application file for complete search history.

(56) References Cited

U.S. PATENT DOCUMENTS

| | | | | |
|---|---|---|---|---|
| 298,265 | A * | 5/1884 | Anderson | 16/2.3 |
| 1,176,619 | A * | 3/1916 | Sykes | 24/694 |
| 3,306,483 | A * | 2/1967 | Bellafiore | 215/306 |
| 5,004,114 | A * | 4/1991 | Terbrusch et al. | 220/296 |
| 6,041,960 | A * | 3/2000 | Leal | 220/315 |
| 6,233,782 | B1 * | 5/2001 | Regele et al. | 16/2.1 |
| 6,374,455 | B1 * | 4/2002 | Regele et al. | 16/2.1 |

* cited by examiner

*Primary Examiner* — Robin Hylton

(57) ABSTRACT

A receptacle lid assembly includes a receptacle that has an open top end and a closed bottom end respectively. The receptacle has a hollow chamber formed therein for receiving debris introduced into the receptacle. A receptacle lid is fitted over the top end of the receptacle. A mechanism maintains the lid in close proximity to the receptacle while the lid is detached from the receptacle, and the lid maintaining mechanism is directly connected to the lid and the receptacle.

8 Claims, 5 Drawing Sheets

RECEPTACLE, LID AND LID MAINTAINING ASSEMBLY

CROSS REFERENCE TO RELATED APPLICATIONS

This application claims the benefit of U.S. Provisional Application No. 60/820,841, filed Jul. 31, 2006, the entire disclosure of which is incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to lid assemblies and, more particularly, to a receptacle lid assembly for a garbage receptacle and like containers for assisting a user to connect a receptacle lid to an associated receptacle.

2. Prior Art

A broad variety of trash and garbage receptacle assemblies, typically now formed of molded plastic, include a separate removable receptacle lid which is frictionally engageable in place over the open upper end of the receptacle to resist wind and animal intrusion. However, these lids are well known to easily become detached from atop the receptacle in the face of stronger winds and persistent animal efforts to obtain access to the contents of the trash receptacle. A number of prior art devices are known to address this issue of retaining the lid in its in-use position until proper access is gained by, for example, trash collector employees. However, one serious defect in many of these prior art inventions is that removal of the lid by a trash collector worker may be too difficult. Should this occur, the wrath of the worker is typically directed to total destruction of the entire receptacle, the contents being strewn about in the process of this destructive frustration.

One prior art example shows an elastic, jawed tether for securing a lid to an associated container, such as a garbage can. The tether comprises an elongated strap terminating at each end in a jawed clamp. The clamp has a self-locking device, such as a cam arrangement, and a screw for closing and locking the jaws in place. A swivel bearing connects each clamp to the strap, so that the clamps have no tendency to twist the strap. Unfortunately, this apparatus is useless for its intended purpose if the jaws thereof become damaged prohibiting the jaws from securing the strap to the lid and the container.

Another prior art example shows a garbage or trash receptacle lid securing device for securing a lid to a garbage or trash receptacle. The device includes an elongated receptacle band formed of flexible pliable material having a length sufficient for circumferential engagement around an upper open end of the receptacle. A releasable connection for connecting each end of the band together is also provided for adjustably tightening and securing the band when positioned circumferentially around the receptacle. A plurality of radially spaced lid straps are each connected one to another at a mid point thereof and, at each end thereof, at spaced apart points to and along said band. The lid straps are of sufficient length whereby, when said band is circumferentially engaged and tightened in position around the receptacle with the lid in a closed position atop the receptacle, the lid straps are automatically tightly positioned centrally across the lid in a generally radially evenly spaced apart relation one to another for lid retention. Alternately, the receptacle band and lid straps may either or both be formed of elastic material for self-biasing engagement, the receptacle band thus being formed as a continuous stretchable loop. Unfortunately, this prior art example is cumbersome and difficult to install and impedes easy placement of debris within the container when the apparatus is attached thereto.

Accordingly, a need remains for a receptacle lid assembly and associated method in order to overcome the above-noted shortcomings. The present invention satisfies such a need by providing an assembly that is convenient to use, is lightweight yet durable in design, and assists a user to connect a receptacle lid to an associated receptacle. Such an assembly prevents receptacle lids and receptacles from being prematurely and undesirably separated. The assembly is also easy to use and does not impede placement of debris within the receptacle. The present invention is simple to use, inexpensive, and designed for many years of repeated use.

BRIEF SUMMARY OF THE INVENTION

In view of the foregoing background, it is therefore an object of the present invention to provide an assembly for a receptacle lid assembly and associated method. These and other objects, features, and advantages of the invention are provided by a combined receptacle and associated lid and connecting assembly for the receptacle and the lid.

The assembly includes a receptacle that has an open top end and a closed bottom end respectively. Such a receptacle has a hollow chamber formed therein for receiving debris introduced into the receptacle. A receptacle lid is conveniently fitted over the top end of the receptacle.

The assembly further includes a mechanism for effectively maintaining the lid in close proximity to the receptacle while the lid is detached from the receptacle. Such a lid maintaining mechanism is directly connected to the lid and the receptacle respectively and conveniently includes a plurality of disc-shaped plates. Such a plurality of plates includes a first plurality of coextensively shaped plates that have top and bottom surfaces respectively, and a bore formed in a central area thereof. Each of such bottom surfaces has a wall monolithically formed therewith and advantageously extending outwardly at a right angle therefrom. Each of such walls effectively spans along an outer circumference of the bores such that the wall continuously surrounds an associated one of the bores. Each of the walls has a threaded outer surface. A first gasket is nested directly against an inner surface of the wall for effectively preventing fluid and debris from passing through the bore.

The plurality of plates further includes a second plurality of coextensively shaped plates that have top and bottom surfaces respectively, and an opening formed in a central area thereof. Each of such bottom surfaces has a wall monolithically formed therewith and advantageously extending outwardly at a right angle therefrom. Each of the walls effectively spans along an outer circumference of the openings such that the wall continuously surrounds an associated one of the openings. Each of the walls has a threaded inner surface. Each of the first plurality of plates has a diameter that is equal to a diameter of each of the second plurality of plates. Each of the walls of the first plurality of plates is threadably interfitted within an associated one of each of the walls of the second plurality of plates during operating conditions such that the lid is effectively intercalated and directly mated between the associated ones of the first and second plates.

The plurality of plates further includes a plurality of flanges monolithically formed in the top surfaces of the first and second pluralities of plates respectively. Such flanges advantageously extend outwardly and away from the top surfaces and further are equidistantly spaced about the top surfaces. The flanges are removably affixed to the plurality of plates and extend oppositely away from the lid after the plurality of plates is connected to each other.

The lid maintaining mechanism includes a flexible cord that has axially opposed first and second ends respectively tethered to selected ones of the plates. Such a cord further includes a substantially cone-shaped cap that has a circular proximal end directly connected to the first and second ends respectively of the cord. Such a cap conveniently has a pointed distal end spaced from the proximal end thereof. Such a circular end of the cap has a diameter that is greater than a diameter of the cord and equal to a diameter of the bores of the first plurality of plates. A second gasket is advantageously intercalated between the proximal end of the cap and an outer surface of a selected one of the plurality of plates. A third gasket is advantageously intercalated between the proximal end of the cap and an outer surface of another one of the plurality of plates. The second and third gaskets remain directly engaged with the selected plate and the associated plate for effectively prohibiting fluids and debris from passing through respective bores of the selected and another plates.

A method for tethering a lid to an associated receptacle includes the steps of providing the receptacle with an open top end and a closed bottom end respectively, providing the lid, drilling a suitably sized hole into an outer wall of the receptacle and the lid respectively, threadably connecting a selected one of a first plurality of plates to an associated one of a second plurality of plates such that the receptacle wall is intercalated therebetween during operating conditions, tightening the selected one of the first plurality of plates to the associated one of the second plurality of plates via a plurality of flanges monolithically formed in respective top surfaces of the first and second pluralities of plates, threadably connecting another one of the first plurality of plates to another associated one of the second plurality of plates such that the lid is intercalated therebetween during operating conditions, tightening the another one of the first plurality of plates to the another associated one of the second plurality of plates via the plurality of flanges, slidably interfitting a cord that has a cap within a bore of each of the first plurality of plates such that the cap directly abuts a top surface of an associated one of the second plurality of plates during operating conditions, introducing debris into the receptacle, and fitting the lid over the top end of the receptacle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
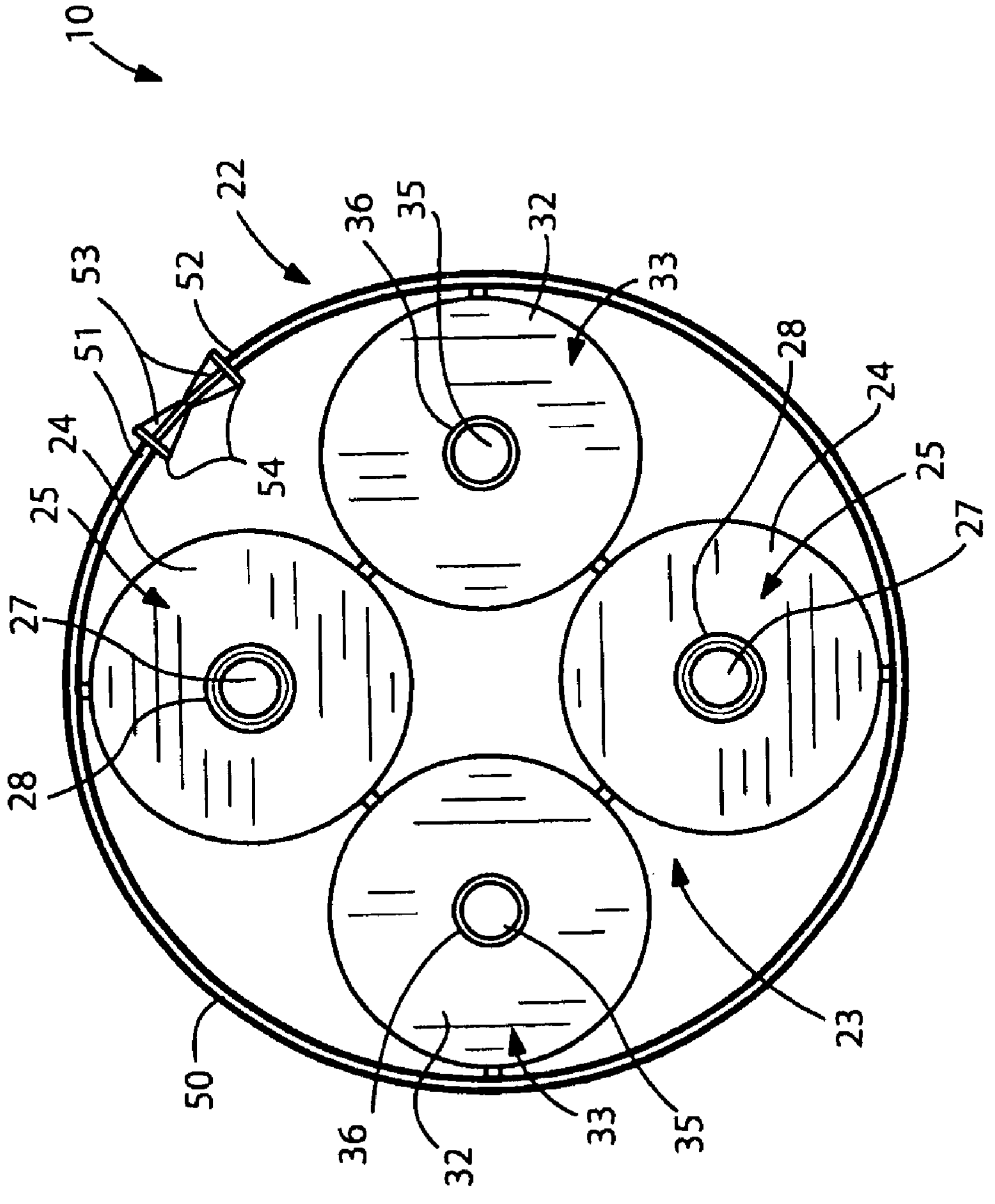
FIG. 1 is a top plan view of the assembly showing the cord and the plurality of plates respectively in a connected arrangement, in accordance with the present invention.
Figure 2:
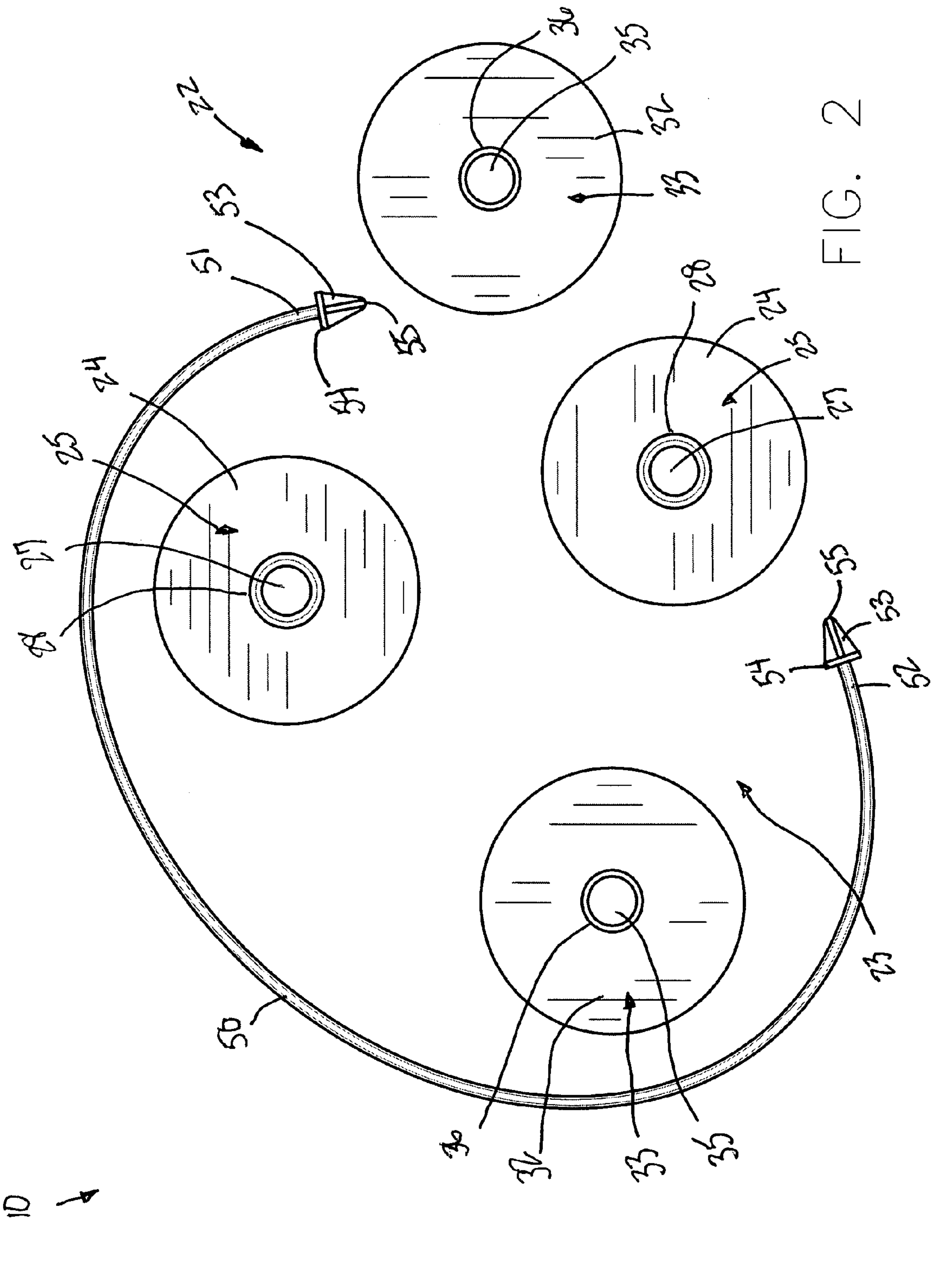
FIG. 2 is a top plan view of the cord and the plurality of plates respectively shown in FIG. 1 in a disconnected arrangement.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The assembly of this invention is referred to generally in FIGS. 1-5 by the reference numeral 10 and is intended to provide a receptacle assembly and associated method. It should be understood that the assembly 10 may be used to secure many different types of lids to many different types of receptacles and should not be limited in use to securing only those types of lids to only those types of receptacles described herein.

Figure 3:
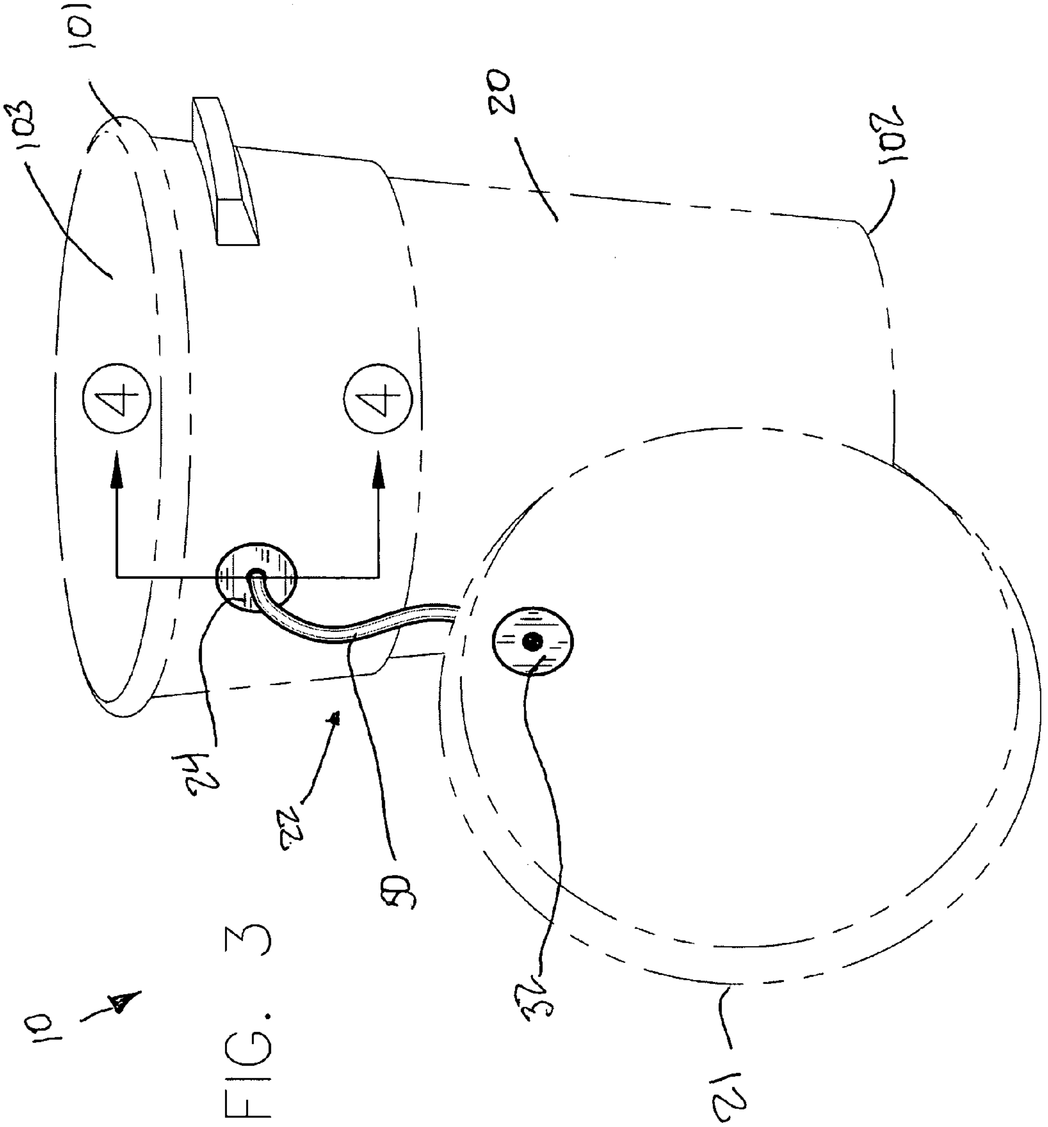
FIG. 3 is a perspective view of the assembly attached to the receptacle and the lid respectively.

Referring initially to FIG. 3, the assembly 10 includes a receptacle 20 that has an open top end 101 and a closed bottom end 102 respectively. Such a receptacle has a hollow chamber 103 formed therein, which is essential for receiving debris introduced into the receptacle 20. A receptacle lid 21 is fitted over the top end 101 of the receptacle 20 for prohibiting debris placed therein from prematurely and undesirably exiting said receptacle 20 during operating conditions.

Referring to FIGS. 1, 2, 3, 4 and 5, the assembly 10 further includes a mechanism 22 for maintaining the lid 21 in close proximity to the receptacle 20 while the lid 21 is detached from the receptacle 20. Such a lid maintaining mechanism 22 is directly connected to the lid 21 and the receptacle 20 respectively and includes a plurality of disc-shaped plates 23. Such a plurality of plates 23 includes a first plurality 24 of coextensively shaped plates that have top 25 and bottom 26 surfaces respectively, and a bore 27 formed in a central area thereof. Each of such bottom surfaces 26 has a wall 28 monolithically formed therewith and extending outwardly at a right angle therefrom. Each of such walls 28 spans along an outer circumference of the bores 27 such that the wall 28 continuously surrounds an associated one of the bores 27. Each of the walls 28 has a threaded outer surface 29. A first gasket 30 is nested directly against an inner surface 31 of the wall, which is crucial for preventing fluid and debris from passing through the bore 27. The plurality of plates allow a cord 50 (herein described below) to be connected thereto for maintaining the lid 21 in close proximity to the receptacle 20 when the lid 21 is removed from the receptacle 20.

Again referring to FIGS. 1 through 5, the plurality of plates 23 further includes a second plurality 32 of coextensively shaped plates that have top 33 and bottom 34 surfaces respectively, and an opening 35 formed in a central area thereof. Each of such bottom surfaces has a wall 36 monolithically formed therewith and extending outwardly at a right angle therefrom. Each of the walls 36 spans along an outer circumference of the openings 35 such that the wall 36 continuously surrounds an associated one of the openings 35. Each of the walls 36 has a threaded inner surface 37. Each of the first plurality of plates 24 has a diameter that is equal to a diameter of each of the second plurality of plates 32. Each of the walls 28 of the first plurality of plates 24 is threadably interfitted within an associated one of each of the walls 36 of the second plurality of plates 32 during operating conditions, which is critical such that the lid 21 is intercalated and directly mated between the associated ones of the first and second plates 24, 32. The first plurality of plates 24 and the second plurality of plates 32 and the cord 50 respectively ensure that a user can remove the lid 21 from the receptacle 20 and release the lid 21 while remaining confident that the lid 21 will remain in close proximity to the receptacle 20.

Figure 5:
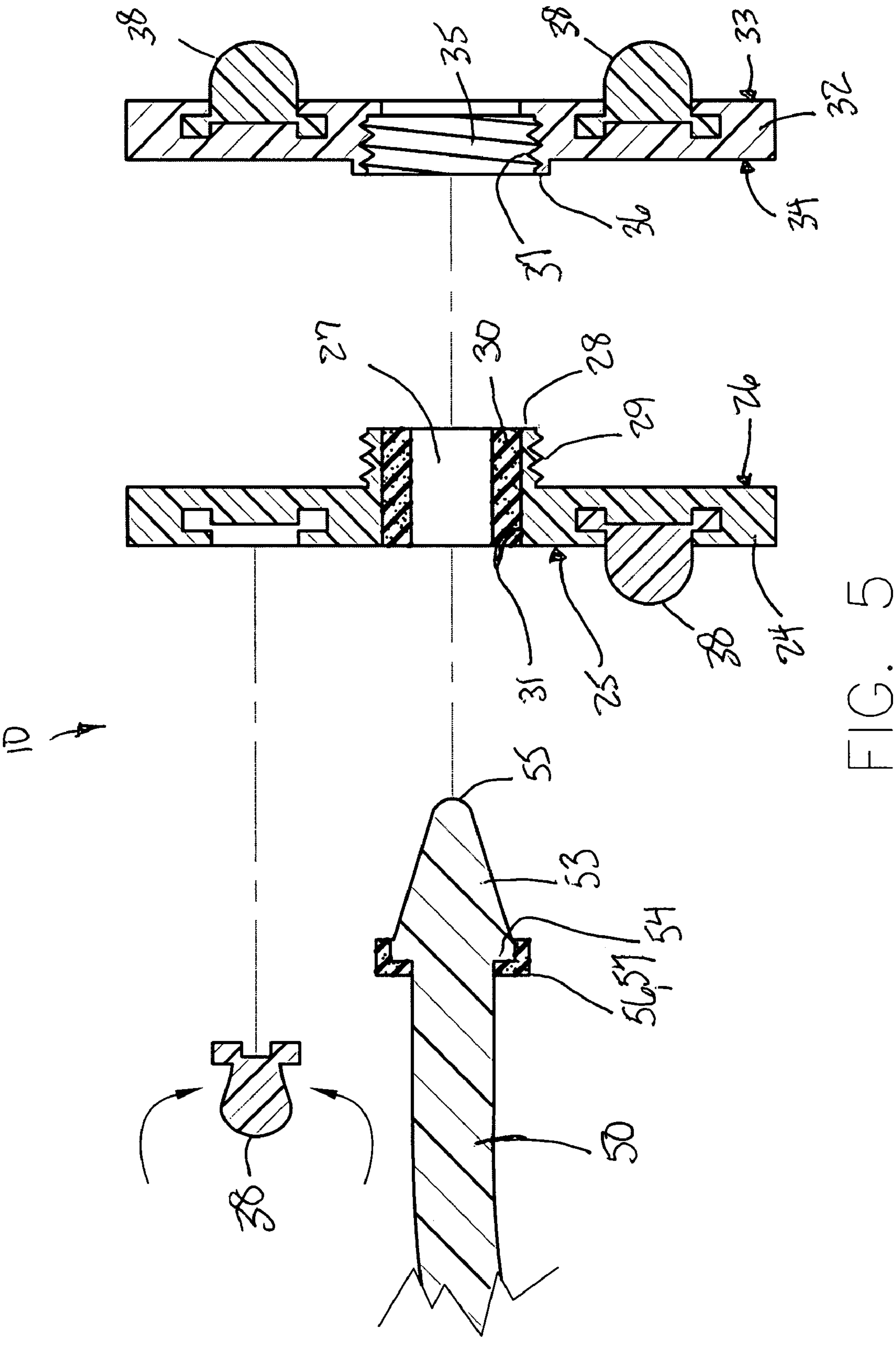
FIG. 5 is a cross sectional view of the assembly shown in FIG. 3, taken along line 4-4, and showing respectively the cord disconnected from the plurality of plates, the first and second plates disconnected from each other, and the flanges connected and disconnected respectively from the plurality of plates.

Referring to FIG. 5, the plurality of plates 23 further includes a plurality of flanges 38 monolithically formed in the top surfaces 25, 33 of the first and second pluralities of plates 24, 32 respectively. Such flanges 38 extend outwardly and away from the top surfaces 25, 33 and further are equidistantly spaced about the top surfaces 25, 33. The flanges 38 are removably affixed to the plurality of plates 23 and extend oppositely away from the lid 21 after the plurality of plates 23 is connected to each other. The flanges 38 allow the user to remove the plurality of plates 23 from the lid 21 and the receptacle 20 respectively and install the plates on another lid and receptacle respectively. The flanges 38 are removably affixed to the plurality of plates 23 via a squeezable snap mechanism, buttons, or screws, as examples.

Yet again referring to FIGS. 1 through 5, the lid maintaining mechanism 22 includes a flexible cord 50 that has axially opposed first 51 and second 52 ends respectively tethered to selected ones of the plurality of plates 23. Such a cord 50 further includes a substantially cone-shaped cap 53 that has a circular proximal end 54 directly connected to the first and second ends 51, 52 respectively of the cord 50. Such a cap 53 has a pointed distal end 55 spaced from the proximal end 54 thereof. Such a proximal end 54 of the cap 53 has a diameter that is greater than a diameter of the cord 50 and equal to a diameter of the bores 27 of the first plurality of plates 24. The cord 50 is removable from the first and second pluralities of plates 24, 32 respectively such that the user can leave the first and second pluralities of plates 24, 32 respectively connected to the lid 21 and the receptacle 20 respectively while removing the cord 50 as desired. The cord 50 may have a hexagonal outer surface as well.

Figure 4:
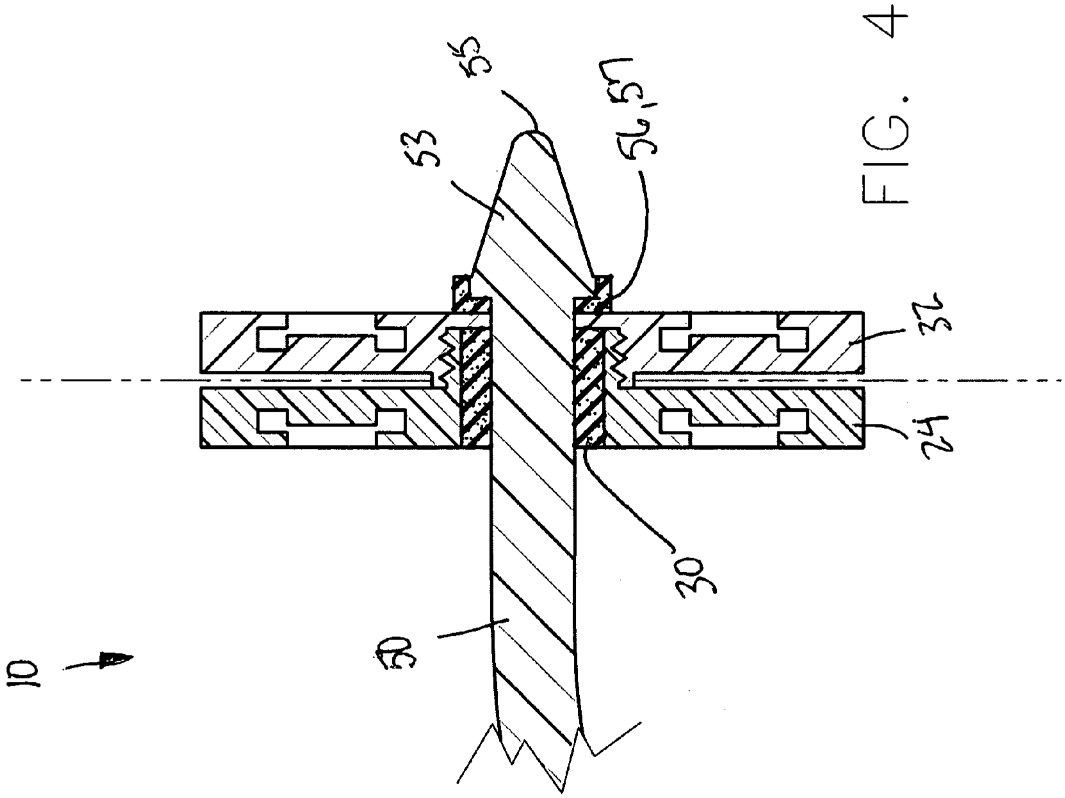
FIG. 4 is a cross sectional view of the cord and the plurality of plates respectively shown in FIG. 3, taken along line 4-4.

Referring to FIGS. 4 and 5, the cord further includes a second gasket 56 intercalated between the proximal end 54 of the cap 53 and an outer surface of a selected one of the plurality of plates 23. A third gasket 57 is intercalated between the proximal end 54 of the cap 53 and an outer surface of another one of the plurality of plates 23. The second and third gaskets 56, 57 remain directly engaged with the selected plate 23 and the associated plate 23, which is necessary for prohibiting fluids and debris from passing through respective bores 27 of the selected and another plates 23. The gaskets 30, 56, 57 allow the user to employ the lid 21 and receptacle 20 for housing liquid debris without the liquid debris prematurely and undesirably exiting the receptacle 20 during operating conditions.

In use, the receptacle lid assembly 10 is simple and straightforward to use. First, the user forms a suitably sized hole in the receptacle 20 and the lid 21 respectively. Next, the user attaches the plurality of plates 23 to the receptacle 20 and the lid 21 respectively. Then, the user attaches the cord 50 to the plurality of plates 23. Then, the user employs the receptacle 20 as desired.

The ability of the user to removably attach the plurality of plates 23 to the lid 21 and the receptacle 20 respectively provides the unexpected benefit of allowing the user to employ the assembly 10 with a multitude of different types of lids 21 and receptacles 20 respectively. In addition, the ability of the user to remove the cord 50 while leaving the plurality of plates 23 in place allows the user to selectively employ the cord 50 as desired, thereby overcoming the prior art shortcomings.

A method 10 for tethering a lid 21 to an associated receptacle 20 includes the steps of providing the receptacle 20 with an open top end 101 and a closed bottom end 102 respectively, providing the lid 21, drilling a suitably sized hole into an outer wall of the receptacle 20 and the lid 21 respectively, threadably connecting a selected one of a first plurality of plates 24 to an associated one of a second plurality of plates 32 such that the receptacle wall is intercalated therebetween during operating conditions, tightening the selected one of the first plurality of plates 24 to the associated one of the second plurality of plates 32 via a plurality of flanges 38 monolithically formed in respective top surfaces 25, 33 of the first and second pluralities of plates 24, 32, threadably connecting another one of the first plurality of plates 24, to another associated one of the second plurality of plates 32 such that the lid 21 is intercalated therebetween during operating conditions, tightening the another one of the first plurality of plates 24 to the another associated one of the second plurality of plates 32 via the plurality of flanges 38, slidably interfitting a cord 50 that has a cap 53 within a bore 27 of each of the first plurality of plates 24 such that the cap 53 directly abuts a top surface 33 of an associated one of the second plurality of plates 32 during operating conditions, introducing debris into the receptacle 20, and fitting the lid 21 over the top end of the receptacle 20.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A combined receptacle and associated lid and connecting assembly for said receptacle and said lid, said combined receptacle, lid, and connecting assembly comprising:

a receptacle having an open top end and a closed bottom end respectively, said receptacle having a hollow chamber formed therein for receiving debris introduced into said receptacle;

a receptacle lid fitted over said top end of said receptacle;

means for maintaining said lid in close proximity to said receptacle while said lid is detached from said receptacle;

said lid maintaining means being attached to said receptacle and to said receptacle lid;

wherein said lid maintaining means comprises a plurality of plates;

a flexible cord having axially opposed first and second ends respectively tethered to selected ones of said plates;

wherein said plurality of plates comprises a first plurality of coextensively shaped plates having top and bottom surfaces respectively, each of said first plurality of plates having a bore formed in a central area thereof, each of said bottom surfaces having a wall monolithically formed therewith and extending outwardly at a right angle therefrom, each of said walls spanning along an outer circumference of said bores such that said wall continuously surrounds an associated one of said bores, each of said walls having a threaded outer surface; and a first gasket nested directly against an inner surface of said wall for preventing fluid and debris from passing through said bore.

2. The combined receptacle, lid, and connecting assembly of claim 1, wherein said plurality of plates further comprises:

a second plurality of coextensively shaped plates having top and bottom surfaces respectively, each of said second plurality of plates having an opening formed in a central area thereof, each of said bottom surfaces having a wall monolithically formed therewith and extending outwardly at a right angle therefrom, each of said walls spanning along an outer circumference of said openings such that said wall continuously surrounds an associated one of said openings, each of said walls having a threaded inner surface;

wherein each of said first plurality of plates has a diameter that is equal to a diameter of each of said second plurality of plates;

wherein each of said walls of said first plurality of plates is threadably interfitted within an associated one of each of said walls of said second plurality of plates during operating conditions such that said lid is intercalated and directly mated between said associated ones of said first and second plates.

3. The combined receptacle, lid, and connecting assembly of claim 2, wherein said cord further comprises:

a cap having a circular proximal end directly connected to said first and second ends respectively of said cord, said cap having a pointed distal end spaced from said proximal end thereof, said circular end of said cap having a diameter that is greater than a diameter of said cord and equal to a diameter of said bores of said first plurality of plates; and a second gasket intercalated between said proximal end of said cap and an outer surface of a selected one of said plurality of plates;

a third gasket intercalated between said proximal end of said cap and an outer surface of another one of said plurality of plates;

wherein said second and third gaskets remain directly engaged with said selected plate and said associated plate for prohibiting fluids and debris from passing through respective bores of said selected and another plates.

4. The combined receptacle, lid, and connecting assembly of claim 3, wherein said plurality of plates further comprises:

a plurality of flanges monolithically formed in said top surfaces of said first and second pluralities of plates respectively, said flanges extending outwardly and away from said top surfaces and further being equidistantly spaced about said top surfaces, said flanges being removably affixed to said plurality of plates and extending oppositely away from said lid after said plurality of plates are connected to each other.

5. A combined receptacle and associated lid and connecting assembly for said receptacle and said lid, said combined receptacle, lid, and connecting assembly comprising:

a receptacle having an open top end and a closed bottom end respectively, said receptacle having a hollow chamber formed therein for receiving debris introduced into said receptacle;

a receptacle lid fitted over said top end of said receptacle;

means for maintaining said lid in close proximity to said receptacle while said lid is detached from said receptacle, said lid maintaining means being directly connected to said lid and said receptacle respectively;

wherein said lid maintaining means comprises a plurality of plates;

a flexible cord having axially opposed first and second ends respectively tethered to selected ones of said plates;

wherein said plurality of plates comprises a first plurality of coextensively shaped plates having top and bottom surfaces respectively, each of said first plurality of plates having a bore formed in a central area thereof, each of said bottom surfaces having a wall monolithically formed therewith and extending outwardly at a right angle therefrom, each of said walls spanning along an outer circumference of said bores such that said wall continuously surrounds an associated one of said bores, each of said walls having a threaded outer surface; and a first gasket nested directly against an inner surface of said wall for preventing fluid and debris from passing through said bore.

6. The combined receptacle, lid, and connecting assembly of claim 5 wherein said plurality of plates further comprises:

a second plurality of coextensively shaped plates having top and bottom surfaces respectively, each of said second plurality of plates having an opening formed in a central area thereof, each of said bottom surfaces having a wall monolithically formed therewith and extending outwardly at a right angle therefrom, each of said walls spanning along an outer circumference of said openings such that said wall continuously surrounds an associated one of said openings, each of said walls having a threaded inner surface;

wherein each of said first plurality of plates has a diameter that is equal to a diameter of each of said second plurality of plates;

wherein each of said walls of said first plurality of plates is threadably interfitted within an associated one of each of said walls of said second plurality of plates during operating conditions such that said lid is intercalated and directly mated between said associated ones of said first and second plates.

7. The combined receptacle, lid, and connecting assembly of claim 6, wherein said cord further comprises:

a cap having a circular proximal end directly connected to said first and second ends respectively of said cord, said cap having a pointed distal end spaced from said proximal end thereof, said circular end of said cap having a diameter that is greater than a diameter of said cord and equal to a diameter of said bores of said first plurality of plates; and a second gasket intercalated between said proximal end of said cap and an outer surface of a selected one of said plurality of plates;

a third gasket intercalated between said proximal end of said cap and an outer surface of another one of said plurality of plates;

wherein said second and third gaskets remain directly engaged with said selected plate and said associated plate for prohibiting fluids and debris from passing through respective bores of said selected and another plates.

8. The combined receptacle, lid, and connecting assembly of claim 7, wherein said plurality of plates further comprises:

a plurality of flanges monolithically formed in said top surfaces of said first and second pluralities of plates respectively, said flanges extending outwardly and away from said top surfaces and further being equidistantly spaced about said top surfaces, said flanges being removably affixed to said plurality of plates and extending oppositely away from said lid after said plurality of plates are connected to each other.

* * * * *